United States Patent [19]
Boram

[11] 4,120,428
[45] Oct. 17, 1978

[54] HAND TOOLS FOR DISPENSING PARTICULATE MATTER

[76] Inventor: Frank Boram, 6 Littlemead, Esher, Surrey, England

[21] Appl. No.: 778,373

[22] Filed: Mar. 17, 1977

[30] Foreign Application Priority Data

Apr. 8, 1976 [GB] United Kingdom ............. 143778/76

[51] Int. Cl.² ............................................. B65D 83/06
[52] U.S. Cl. ................................................ 222/201
[58] Field of Search ............... 222/196, 161, 199, 189, 222/191, 201, 190; 221/200, 202, 204, 205; 111/75, 76

[56] References Cited

U.S. PATENT DOCUMENTS

| 18,104 | 9/1857 | Rogers | 222/201 |
|---|---|---|---|
| 2,278,150 | 3/1942 | Roscoe | 222/196 |
| 2,525,641 | 10/1950 | Bouska | 222/161 |
| 3,212,683 | 10/1965 | Santomieri | 222/201 |

*Primary Examiner*—Stanley H. Tollberg
*Attorney, Agent, or Firm*—Larson, Taylor and Hinds

[57] ABSTRACT

A hand tool for dispensing particulate matter includes a scoop and a handle. Structure for vibrating the scoop are provided on the scoop itself or in the handle. Vibration of the scoop causes movement of particulate material in the scoop progressively to the open end of the scoop so that the particulate material can be dispensed from the scoop in a controlled manner.

11 Claims, 6 Drawing Figures

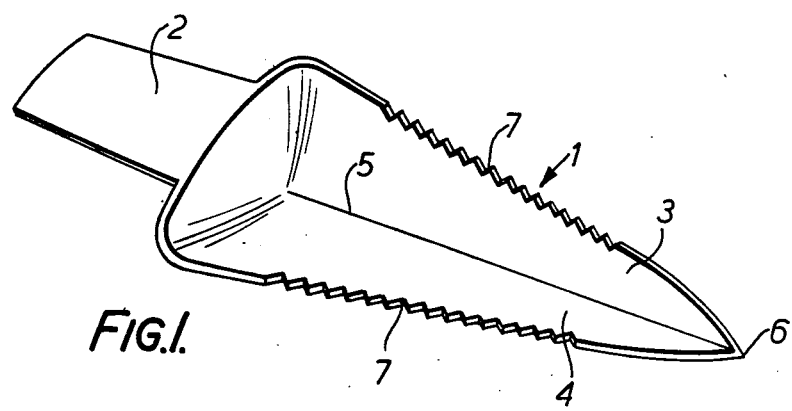
FIG.1.
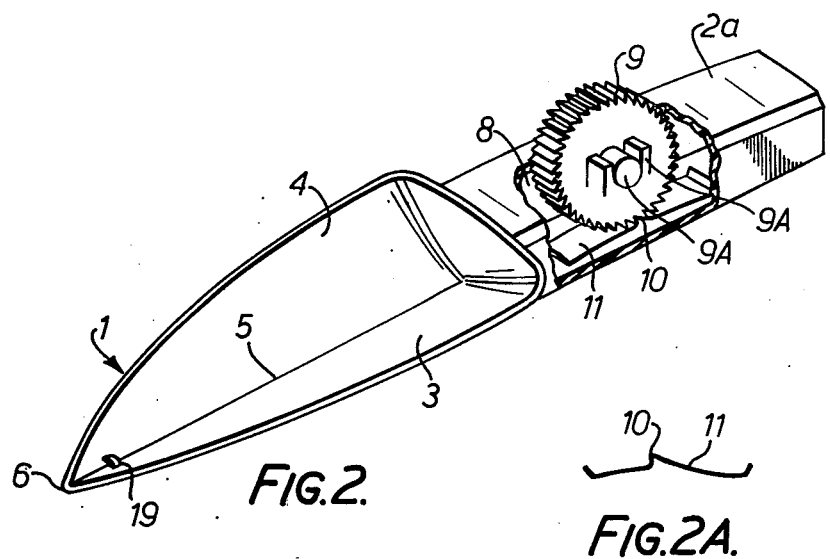
FIG.2.
FIG.2A.
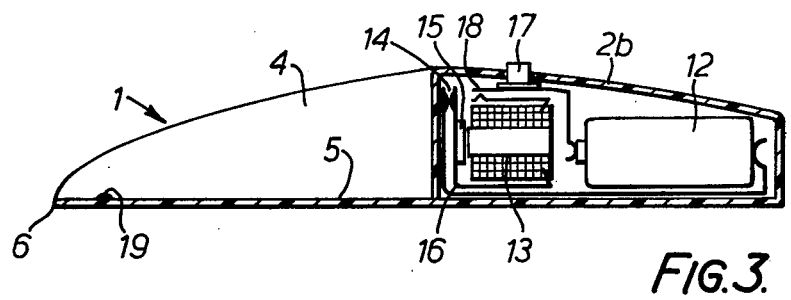
FIG.3.

HAND TOOLS FOR DISPENSING PARTICULATE MATTER

BACKGROUND OF THE INVENTION

1. Field of the Invention

This invention relates to hand tools for dispensing particulate matter, for example seed, sequentially, preferably one item at a time.

2. Description of the Prior Art

Known hand tools for dispensing seeds consist of a handle and a scoop. To dispense seeds from the tool the scoop is inclined and shaken. The disadvantage of those known tools is that it is extremely difficult to dispense seeds in a controlled manner from the scoop using this method and virtually impossible to dispense seeds one at a time. It is an object of the invention to overcome this disadvantage.

SUMMARY OF THE INVENTION

According to the present invention there is provided a hand tool for dispensing particulate matter comprising a scoop for containing a supply of the particulate matter and means for vibrating the scoop whereby to vibrate particulate matter in the scoop and to dispense the particulate matter from a free end of the scoop sequentially.

Further according to the present invention there is provided a hand tool for dispensing particulate matter comprising a scoop of generally V-section for containing the particulate matter, a handle rigid with the scoop and vibration-generating means housed in the handle whereby to vibrate the scoop and to dispense the particulate material sequentially.

BRIEF DESCRIPTION OF THE DRAWINGS

Hand tools embodying the invention will now be described, by way of example, with reference to the accompanying diagrammatic drawings in which:

FIG. 1 is a perspective view of one embodiment;

FIG. 2 is a perspective view of a second embodiment, with a part thereof broken away to reveal a mechanical vibrator;

FIG. 2A is a side elevation of a detail;

FIG. 3 is a longitudinal cross-section of a third embodiment;

DESCRIPTION OF THE PREFERRED EMBODIMENTS

Figure 4:
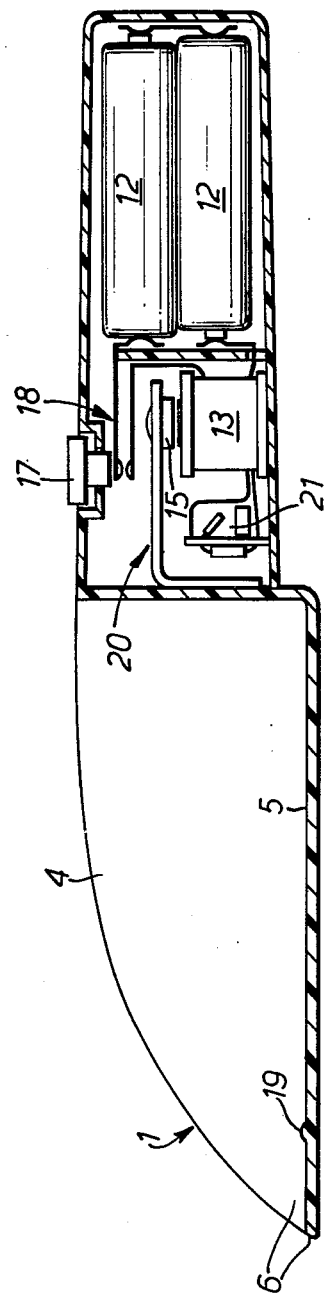
FIG. 4 is a longitudinal cross-section of a fourth embodiment.
Figure 5:
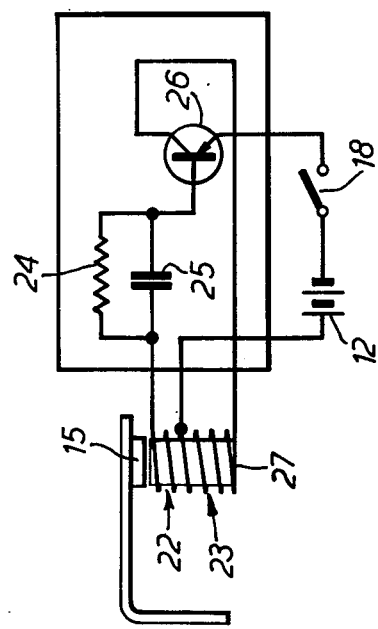
FIG. 5 is a circuit diagram of the fourth embodiment.

Referring to FIG. 1, the first embodiment comprises a scoop 1 integral with a handle 2. The scoop 1 comprises a pair of mutually inclined walls 3,4 disposed to form a shallow V-section, the junction 5 of the wall constituting an elongate groove for the passage of seeds (not shown) or other particulate matter contained in the scoop 1 to the free end 6.

A series of serrations 7 is formed along the upper edge of at least one of the walls 3 and 4. When the implement is held and one or both of the series of serrations is/are stroked, the tool is caused to vibrate in a direction generally transverse to the length of the groove 5 and this, in turn, causes the seeds to move along the elongate groove towards the free, pointed, end 6 when the tool is held so that the scoop is inclined downwardly at a shallow angle.

Preferably, the serration(s) 7 are of sawtooth or inverted V-shaped form.

The embodiment of FIG. 2, has a hollow handle 2a with an aperture 8 through which a portion of a serrated wheel 9 protrudes. The serrations are preferably of sawtooth form. The wheel 9, preferably of polyamide is mounted so that the serrations contact a transverse rib 10 of a resilient, preferably metal, strip 11 or other click member. The form of this member is best shown in FIG. 2A. End portions of the strip 11 bear on the inside of the handle and are formed to prevent the metal digging into the plastics material, the strip being generally bowed so as to bias the rib 10 towards the wheel 9. When the wheel is manually rotated, the rib 10 clicks over the serrations thereof producing the desired vibration. Preferably, the mounting of the wheel 9 is such that increased pressure on the wheel produces a corresponding increase in the amplitude of the vibrations. As shown, the wheel is mounted by integral pins 9A movable between guides 9B provided on the inside of the handle and the wheel is retained within the handle by a cover (not shown).

The handle 2b of the embodiment of FIG. 3 is again hollow and receives a battery 12. An electromagnet 13 is fixedly mounted in the handle 2b adjacent a normally closed set of contacts 14. A flexible arm bearing one of the contacts of the set also carries an iron disc 15 which forms the armature of the electromagnet, the arm being flexible about a point 16. Thus when a push-button 17 in the handle is depressed, the switch 18 is closed and the electromagnet is energized through the set of contacts 14. The disc 15 is attracted by the electromagnet and the set of contacts 14 are opened to de-energize the electromagnet. The disc 15 is thereupon released and the contact set closes to reenergize the electromagnet. In this way the desired vibrations are produced. The contact 14 may be located at either end of the electromagnet.

In the embodiment shown in FIG. 4 parts similar to those in FIG. 3 are similarly referenced.

Housed inside the handle of the scoop is an L-shaped resonant arm 20 of plastics or metal. One limb of the arm 20 is rigid with the wall of the scoop while the other limb carries an armature in the form of an iron rivet or stud 15. An electromagnet 13 housed inside the handle is positioned to attract magnetically, when energized, the rivet 15. The energization of the electromagnet is controlled by a transistor circuit 21 powered by two batteries 12 through a manually-operable switch 18, which can be closed by depression of a button 17.

The transistor circuit 21 is shown in FIG. 4. In FIG. 4 a P.N.P. transistor has its emitter-collector path connected in series with a coil 23 of the electromagnet 13, the batteries 12 and the switch 18; the coil 23 being connected between the negative terminal of the battery 12 and the emitter, and the switch being connected between the positive terminal of the battery and the collector. A feed-back coil 22, wound on a common ferrite core 27 with the coil 23, is connected in series with the parallel circuit combination of a capacitor 25 and a resistor 24, and the series combination is connected between the negative terminal of the battery 12 and the base of the transistor 26.

In operation, the transistor circuit acts as an oscillator and so periodically energizes the coil 23. In this way the resonant arm 20 is vibrated through the interaction between the rivet 15 and the electromagnet 23 and the vibrations are transmitted to the scoop.

It will be appreciated that instead of using the resonant arm, the electromagnet can be positioned adjacent a wall section of the scoop or handle to vibrate the same. If necessary the wall section can be thinned or grooved to make it sufficiently flexible for displacement by the electromagnet and if the wall section is not of magnetizable material a magnetizable stud can be appropriately mounted thereon.

As shown in FIG. 2, 3 and 4 at least one small barrier 19 is provided adjacent the free end 6. This forces seeds or other particulate matter travelling along the groove towards the free end 6 to jump clear of the barrier, thus assisting separation of the seeds and ensuring that they are delivered one at a time. A similar barrier or barriers may be provided in the tool of FIG. 1.

The handle 26 may have a removable cover for access to operating parts of the vibrators.

The operation of the implements illustrated in FIGS 2, 3 and 4 is the same as that described for the implement of FIG. 1, the difference lying in the manner in which the scoop is caused to vibrate. All embodiments are preferably made of anti-static, plastics material. A seed reservoir may be incorporated between the handle and the scoop or may be incorporated in the handle itself.

Many modifications can be made to the invention without departing from the spirit and scope of the invention as defined by the appended claims.

I claim:

1. A hand tool for dispensing particulate matter comprising
    a scoop for containing a supply of particulate matter having a closed end portion against which particulate material can be accumulated and a free end portion for the ingress and egress of material to and from the scoop,
    scoop vibrating means operable to vibrate particulate matter in the scoop to progressively drive the particular matter towards the free end portion of the scoop for discharge therefrom, and
    weir means extending traversely of the scoop at the free end portion thereof to separate the particles from one another prior to discharge.

2. A hand tool for dispensing particulate matter comprising
    a scoop having two walls arranged in generally V-shaped configuration for containing the particulate matter,
    a handle rigid with the scoop,
    vibration-generating means housed in the handle operable to vibrate the scoop and so progressively drive the particulate material towards the end of the scoop remote from the handle, and
    a barrier secured to the two walls of the scoop adjacent the end of the scoop remote from the handle arranged to separate individual items of the particulate matter as it progressively traverses the barrier.

3. A hand tool according to claim 1, wherein the vibrating means comprises serrations along at least one of the walls of the scoop.

4. A hand tool according to claim 2, wherein the vibration-generating means comprises an electrically-operated transducer.

5. A hand tool according to claim 2, wherein the vibration-generating means comprises
    an electromagnet having an energizing coil and an armature coupled to the scoop to transmit any vibrations to the scoop,
    a manually operable switch,
    a power source,
    and means connecting the manually-operable switch, the energizing coil, and the power source in series so that closure of the switch causes energization of the electromagnet and thus vibration of the armature.

6. A hand tool according to claim 2, wherein the vibration-generator means comprises
    an electromagnet having an energizing coil and an armature
    means coupling the armature to the scoop to transmit any vibrations to which it is subjected to the scoop,
    an electrical oscillator, and
    means connecting the oscillator to drive the energizing coil and so vibrate the armature.

7. A hand tool according to claim 2, wherein the vibration-generating means comprises
    a serrated wheel rotatably supported and projecting at least partially from the handle,
    a click member coupled to the handle to transmit any vibrations through the handle to the scoop, the click member also being mounted to co-operate with the wheel to be displaced by the serrations of the wheel when the wheel is rotated.

8. A hand tool according to claim 7, wherein the click member is of resilient material and is arranged to bias the wheel outwardly of the handle and the energy of the vibrations can be varied by varying the pressure applied to the wheel.

9. A hand tool according to claim 7, wherein the click member is a resilient strip of metal having a transverse rib contacting the serrations of the wheel and wherein the serrations of the wheel are of saw-tooth form.

10. A hand tool according to claim 2 including a particulate matter reservoir within the handle and communicating with the scoop.

11. A hand tool according to claim 1 wherein the weir means comprises a single transverse wall located at the bottom of the scoop.

* * * * *